United States Patent
Kadowaki et al.

(10) Patent No.: US 9,509,208 B2
(45) Date of Patent: Nov. 29, 2016

(54) LOAD DRIVING DEVICE AND ELECTRONIC DEVICE USING SAME

(75) Inventors: Issei Kadowaki, Kyoto (JP); Norihiro Maeda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 424 days.

(21) Appl. No.: 14/122,292

(22) PCT Filed: May 25, 2012

(86) PCT No.: PCT/JP2012/063471
§ 371 (c)(1),
(2), (4) Date: Nov. 26, 2013

(87) PCT Pub. No.: WO2012/165328
PCT Pub. Date: Dec. 6, 2012

(65) Prior Publication Data
US 2014/0084835 A1    Mar. 27, 2014

(30) Foreign Application Priority Data

May 27, 2011    (JP) ................................ 2011-119207

(51) Int. Cl.
| | |
|---|---|
| *H02M 1/32* | (2007.01) |
| *H02M 1/36* | (2007.01) |
| *H02M 3/155* | (2006.01) |
| *H02M 1/00* | (2006.01) |

(52) U.S. Cl.
CPC ................ *H02M 1/32* (2013.01); *H02M 1/36* (2013.01); *H02M 3/155* (2013.01); *H02M 2001/0006* (2013.01)

(58) Field of Classification Search
USPC ...................... 318/479, 478, 445; 363/50, 13
See application file for complete search history.

(56) References Cited

U.S. PATENT DOCUMENTS

| | | | |
|---|---|---|---|
| 7,129,679 B2 * | 10/2006 | Inaba .................... | H02M 3/156 323/222 |
| 7,973,585 B2 * | 7/2011 | Kubo ............. | H03K 19/018528 327/309 |
| 9,054,517 B1 * | 6/2015 | Zhu ......................... | H02H 9/04 |
| 2005/0007089 A1 | 1/2005 | Niiyama et al. | |
| 2007/0258174 A1 | 11/2007 | Yamamoto et al. | |

(Continued)

FOREIGN PATENT DOCUMENTS

| | | |
|---|---|---|
| CN | 1540632 A | 10/2004 |
| CN | 101072012 | 11/2007 |

(Continued)

OTHER PUBLICATIONS

Japanese Patent Office, International Search Report for International Patent Application PCT/JP2012/063471, with English translation (Aug. 21, 2012).

*Primary Examiner* — Kawing Chan
(74) *Attorney, Agent, or Firm* — Fish & Richardson P.C.

(57) ABSTRACT

A load driving device according to the present invention has: an internal circuit (DRV) that operates in response to the supply of a power supply voltage (HV or LV); an output circuit (PD1 and PD2) for driving a load in response to the supply of the power supply voltage (HV or LV); an abnormality detection circuit (12) for monitoring the power supply voltage (HV or LV) and generating an abnormality detection signal (S1); and a power supply switch (P0) for, according to the abnormality detection signal (S1), conducting or cutting off a power-supply-voltage supply line to the internal circuit (DRV).

18 Claims, 11 Drawing Sheets

(56) References Cited

U.S. PATENT DOCUMENTS

| | | |
|---|---|---|
| 2008/0315808 A1 | 12/2008 | Mishima |
| 2009/0154312 A1 | 6/2009 | Takarabe |
| 2009/0190449 A1 | 7/2009 | Yamada et al. |
| 2009/0251088 A1 | 10/2009 | Fukuda et al. |
| 2009/0303641 A1* | 12/2009 | Abe ................. H02M 1/32 361/18 |
| 2010/0264866 A1 | 10/2010 | Mishima |
| 2010/0308888 A1 | 12/2010 | Kubo |
| 2011/0089878 A1 | 4/2011 | Mishima |
| 2011/0133711 A1* | 6/2011 | Murakami ........ H03K 17/0822 323/282 |
| 2012/0049829 A1* | 3/2012 | Murakami ............ H02M 1/32 323/288 |
| 2012/0250204 A1* | 10/2012 | Wada ................... H02H 3/207 361/86 |
| 2012/0293904 A1* | 11/2012 | Salcedo ................ H02H 9/046 361/111 |
| 2013/0063990 A1* | 3/2013 | Yang ..................... H02M 1/32 363/55 |
| 2014/0043875 A1* | 2/2014 | Hsing ..................... G05F 1/56 363/77 |

FOREIGN PATENT DOCUMENTS

| | | |
|---|---|---|
| CN | 101286719 | 10/2008 |
| CN | 101454832 A | 6/2009 |
| CN | 101557098 | 10/2009 |
| JP | 01-318553 | 12/1989 |
| JP | 06-098532 | 4/1994 |
| JP | 2005-033862 | 2/2005 |
| JP | 2008-263733 | 10/2008 |
| TW | 200926154 A | 6/2009 |

* cited by examiner

LOAD DRIVING DEVICE AND ELECTRONIC DEVICE USING SAME

TECHNICAL FIELD

The present invention relates to a load driving device, and to an electronic device incorporating a load driving device.

BACKGROUND ART

Conventionally, load driving devices such as motor driver ICs and switching regulator ICs are in wide and common use.

An example of related conventional technology is seen in Patent Document 1 listed below.

LIST OF CITATIONS

Patent Literature

Patent Document 1: Japanese Patent Application Publication No. 2008-263733

SUMMARY OF THE INVENTION

Problem to be Solved by the Invention

In general, a component (device) that constitutes an output circuit of a load driving device (in particular, an output device such as a power transistor) is designed to have a withstand voltage that suits the electrical characteristics (such as the absolute maximum rated value of a supply voltage) defined in the specification of the load driving device. Thus, when overvoltage destruction testing exceeding the rating is conducted, the load driving device may suffer smoking or destruction.

The simplest imaginable solution to the above problem is to raise the withstand voltage of the component. However, raising the withstand voltage (in particular, the gate-source withstand voltage) of the output device among all the components constituting the circuit requires increasing the size of the output device and hence increasing the chip area, posing another problem. In particular, in a load driving device designed to feed a large current to a load, a large output device is used to reduce its on-state resistance, and thus the output device occupies a very large proportion of the entire chip area. Thus, further increasing the size of the output device simply to cope with destructive testing leads to an even larger chip area and hence a higher cost, making the solution impractical.

Another imaginable solution to the above problem is to provide an overvoltage protection capability on the part of the target product in which the load driving device is incorporated. However, providing the target product with an overvoltage protection capability requires externally fitting additional components to the load driving device, and thus leads to a higher cost of the product as a whole, thereby posing another problem.

In view of the problem experienced by the present inventors, an object of the present invention is to provide a load driving device that withstands destructive testing without unnecessarily increasing the withstand voltage of a component, and to provide an electronic device incorporating such a load driving device.

Means to Solve the Problem

To achieve the above object, according to one aspect of the present invention, a load driving device includes: an internal circuit which operates by being fed with a supply voltage; an output circuit which drives a load by being fed with the supply voltage; a fault detection circuit which monitors the supply voltage to generate a fault detection signal; and a power switch which connects/disconnects a supply voltage feed line leading to the internal circuit according to the fault detection signal (a first configuration).

In the load driving device according to the first configuration described above, preferably, the internal circuit includes a driving circuit which feeds the output circuit with a driving signal (a second configuration).

In the load driving device according to the second configuration described above, preferably, there is further provided a pull-down resistor which is connected between a supply voltage input node of the internal circuit and a grounded node (a third configuration).

In the load driving device according to the third configuration described above, preferably, the output circuit includes a p-type upper transistor which is connected between a supply voltage node and an output node (a fourth configuration).

In the load driving device according to the fourth configuration described above, preferably, there is further provided a first upper switch which connects/disconnects between the gate of the upper transistor and the supply voltage node according to the fault detection signal (a fifth configuration).

In the load driving device according to the fifth configuration described above, preferably, there is further provided a second upper switch which connects/disconnects between the gate of the upper transistor and the driving circuit according to the fault detection signal (a sixth configuration).

In the load driving device according to any one of the fourth to sixth configurations described above, preferably, the output circuit includes an n-type lower transistor which is connected between the grounded node and the output node (a seventh configuration).

In the load driving device according to the seventh configuration described above, preferably, there is further provided a first lower switch which connects/disconnects between the gate of the lower transistor and the grounded node according to the fault detection signal (an eighth configuration).

In the load driving device according to the eighth configuration described above, preferably, there is further provided a second lower switch which connects/disconnects between the gate of the lower transistor and the driving circuit according to the fault detection signal (a ninth configuration).

In the load driving device according to any one of the first to ninth configurations described above, preferably, the internal circuit includes a first internal circuit which operates by receiving a first supply voltage and a second internal circuit which operates by receiving a second supply voltage lower than the first supply voltage, and the output circuit includes a first output circuit which drives a first load by receiving the first supply voltage and a second output circuit which drives a second load by receiving the second supply voltage (a tenth configuration).

In the load driving device according to the tenth configuration described above, preferably, the fault detection circuit includes a first overvoltage detector which monitors the first supply voltage to generate a first overvoltage detection signal, a second overvoltage detector which monitors the second supply voltage to generate a second overvoltage detection signal, and a fault detection signal generator which generates the fault detection signal based on the first and second overvoltage detection signals (an eleventh configuration).

In the load driving device according to the eleventh configuration described above, preferably, the first overvoltage detector includes a first comparator which generates the first overvoltage detection signal by comparing the first supply voltage with a first overvoltage detection voltage, and the second overvoltage detector includes a second comparator which generates the second overvoltage detection signal by comparing the second supply voltage with a second overvoltage detection voltage (a twelfth configuration).

In the load driving device according to the eleventh or twelfth configuration described above, preferably, there is further provided a first level shifter which shifts the signal level of, and then feeds to the fault detection signal generator, the first overvoltage detection signal (a thirteenth configuration).

In the load driving device according to the thirteenth configuration described above, preferably, the first level shifter includes a transistor of which the drain is connected to a node to which the first supply voltage is applied and the gate is connected to a node to which the first overvoltage detection signal is applied; a current source which is connected between the source of the transistor and the grounded node; and an inverter of which the input node is connected to the source of the transistor, the output node is connected to the fault detection signal generator, the first supply voltage node is connected to a node to which the second supply voltage is applied, and the second supply voltage node is connected to the grounded node (a fourteenth configuration).

In the load driving device according to any one of the eleventh to fourteenth configurations described above, preferably, the fault detection circuit further includes an undervoltage detector which monitors the first supply voltage to generate an undervoltage detection signal, and the fault detection signal generator generates the fault detection signal based on the first overvoltage detection signal, the second overvoltage detection signal, and the undervoltage detection signal (a fifteenth configuration).

In the load driving device according to the fifteenth configuration described above, preferably, the undervoltage detector generates the undervoltage detection signal by comparing the first supply voltage with an undervoltage detection voltage (a sixteenth configuration).

In the load driving device according to any one of the first to sixteenth configuration described above, preferably, there is further provided a second level shifter which shifts the signal level of the fault detection signal (a seventeenth configuration).

In the load driving device according to the seventeenth configuration described above, preferably, the second level shifter shifts the signal level of the fault detection signal from a state where the fault detection signal pulsates between the second supply voltage and a ground voltage to a state where the fault detection signal pulsates between the first supply voltage and a first compensated supply voltage which is lower than the first supply voltage by a predetermined value or to a state where the fault detection signal pulsates between the second supply voltage and a second compensated supply voltage which is lower than the second supply voltage by a predetermined value (an eighteenth configuration).

In the load driving device according to the eighteenth configuration described above, preferably, there is further provided a compensated supply voltage generator which generates from the first or second supply voltage, and feeds to the second level shifter, the first or second compensated supply voltage (a nineteenth configuration).

In the load driving device according to the nineteenth configuration described above, preferably, the compensated supply voltage generator includes: a first transistor of which the source is connected to a node to which the first or second compensated supply voltage is applied and the drain is connected to the grounded node; a second transistor of which the emitter is commented to the gate of the first transistor; a zener diode of which the anode is connected to the base and the collector of the second transistor and the cathode is connected to the node to which the first or second supply voltage is applied; a first resistor which is connected between the source of the first transistor and the node to which the first or second supply voltage is applied; and a second resistor which is connected between the emitter of the second transistor and the grounded node (a twelfth configuration).

According to another aspect of the present invention, an electronic device includes the load driving device according to any one of the first to twelfth configurations described above and a load driven by the load driving device (a twenty-first configuration).

Preferably, the electronic device according to the twenty-first configuration described above is an optical disc drive which is incorporated in a computer for playback from, or for recording to and playback from, an optical disc, and the load is at least one of a spindle motor, a sled motor, a loading motor, a focus actuator, a tracking actuator, and a tilt actuator (a twenty-second configuration).

Advantageous Effects of the Invention

According to the present invention, it is possible to provide a load driving device that withstands destructive testing without unnecessarily increasing the withstand voltage of a component, and to provide an electronic device incorporating such a load driving device.

BRIEF DESCRIPTION OF DRAWINGS

FIG. 8 is a circuit diagram showing an exemplary configuration of a level shifter 124a;

DESCRIPTION OF EMBODIMENTS

<Optical Disc Drive>

Hereinafter, a detailed description will be given of an example where the present invention is applied to a motor driver IC incorporated in an optical disc drive.

Figure 1:
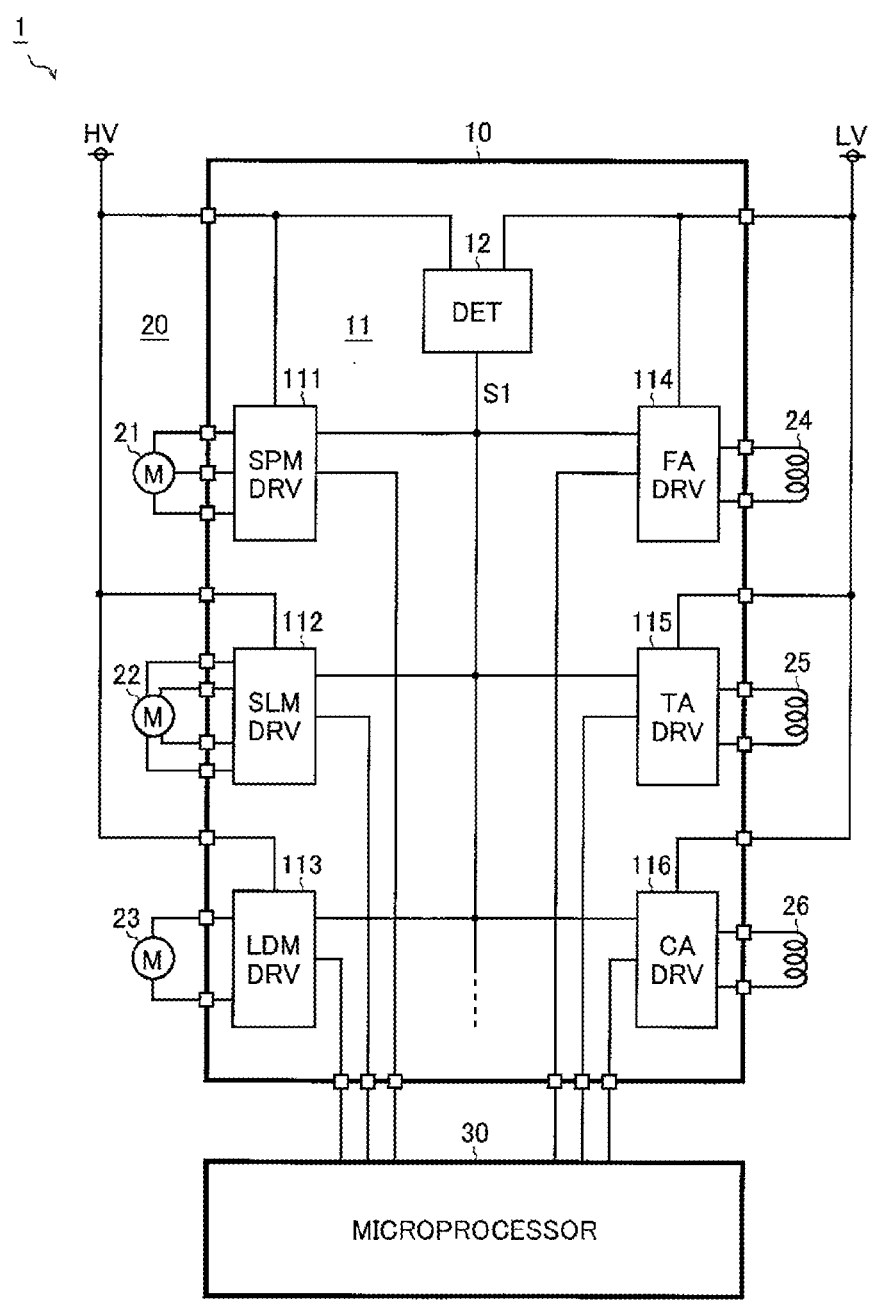
FIG. 1 is a block diagram showing an exemplary configuration of an optical disc drive according to the present invention.

FIG. 1 is a block diagram showing an exemplary configuration of an optical disc drive. The optical disc drive 1 is, for example, incorporated in a personal computer (PC) to allow playback from, or recording to and playback from, optical discs (such as BDs, DVDs, and CDs). The optical disc drive 1 includes a motor driver IC 10, a plurality of loads 20, and a microprocessor 30.

The motor driver IC 10 is a multiple-channel load driving device which drives and controls, according to instructions from the microprocessor 30, a plurality of loads (a spindle motor 21, a sled motor 22, a loading motor 23, a focus actuator 24, a tracking actuator 25, and a tilt actuator 26). The motor driver IC 10 includes, as a multiple-channel load driving circuit 11, a spindle motor driver circuit 111, a sled motor driver circuit 112, a loading motor driver circuit 113, a focus actuator driver circuit 114, a tracking actuator driver circuit 115, and a tilt actuator driver circuit 116. The motor driver IC 10 further includes a fault detection circuit 12 which monitors a first supply voltage HV (for a 12 V system) and a second supply voltage LV (for a 5 V system), both fed from outside the IC, to generate a fault detection signal S1.

The spindle motor driver circuit 111 is fed with the first supply voltage HV, and drives and controls the spindle motor 21 so as to rotate a turntable (not illustrated), on which an optical disc is placed, at a constant linear velocity or at a constant rotational velocity. Usable as the spindle motor 21 is, for example, a brushed DC motor or a three-phase brushless motor.

The sled motor driver circuit 112 is fed with the first supply voltage HV, and drives and controls the sled motor 22 so as to slide an optical pickup (not illustrated) in the radial direction of the optical disc. Usable as the sled motor 22 is, for example, a brushed DC motor or a two-phase brushless stepping motor.

The loading motor driver circuit 113 is fed with the first supply voltage HV, and drives and controls the loading motor 23 so as to slide a loading tray (not illustrated), on which an optical disc is placed. Usable as the loading motor 23 is, for example, a brushed DC motor.

The focus actuator driver circuit 114 is fed with the second supply voltage LV, and drives and controls the focus actuator 24, thereby to drive an objective lens of the optical pickup so as to control the focus of the beam spot formed on the optical disc.

The tracking actuator driver circuit 115 is fed with the second supply voltage LV, and drives and controls the tracking actuator 25, thereby to drive the objective lens of the optical pickup so as to control the tracking of the beam spot formed on the optical disc.

The tilt actuator driver circuit 116 is fed with the second supply voltage LV, and drives and controls the tilt actuator 26, thereby to drive the objective lens of the optical pickup so as to compensate for fluctuations in signal strength ascribable to deformation of the optical disc.

Figure 2:
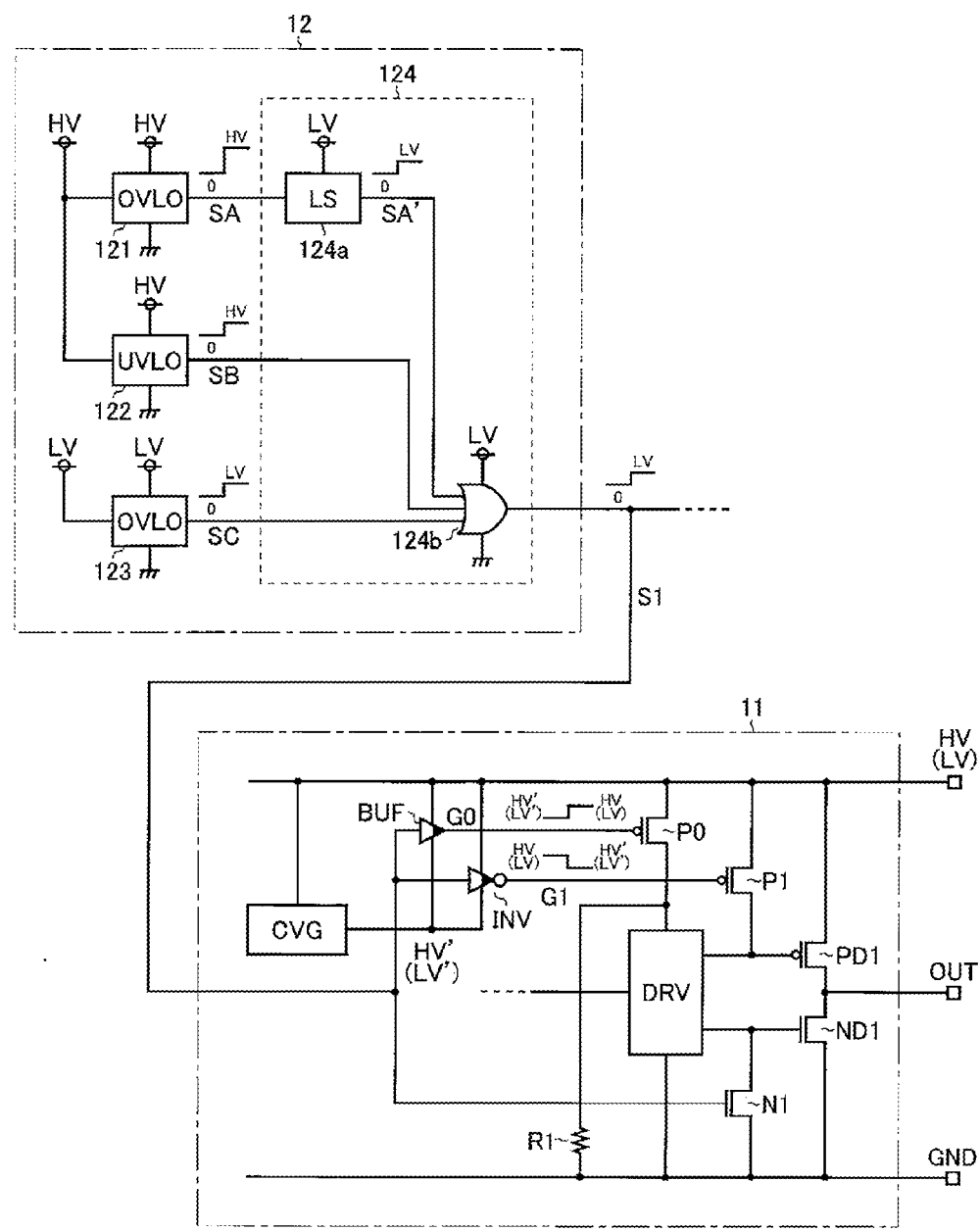
FIG. 2 is a circuit diagram of an exemplary configuration of a load driving circuit 11 and a fault detection circuit 12.

FIG. 2 is a circuit diagram of an exemplary configuration of the load driving circuit 11 and the fault detection circuit 12. As to the load driving circuit 11 shown there, it should be understood that, for simplicity's sake, only the circuitry of and around the output stage for one phase is illustrated with respect to one of the spindle motor driver circuit 111, the sled motor driver circuit 112, the loading motor driver circuit 113, the focus actuator driver circuit 114, the tracking actuator driver circuit 115, and the tilt actuator driver circuit 116.

The fault detection circuit 12 includes a first overvoltage detector 121, an undervoltage detector 122, a second overvoltage detector 123, and a fault detection signal generator 124.

The first overvoltage detector 121 monitors whether or not the first supply voltage HV is higher than an overvoltage detection voltage Vth1 (for example, Vth1=18 V) to generate a first overvoltage detection signal SA. The first overvoltage detection signal SA is, when the first supply voltage HV is lower than the overvoltage detection voltage Vth1, at a normal-mode logical level (low level (GND)) and, when the first supply voltage HV is higher than the overvoltage detection voltage Vth1, at an abnormal-mode logical level (high level (HV)).

Figure 5:
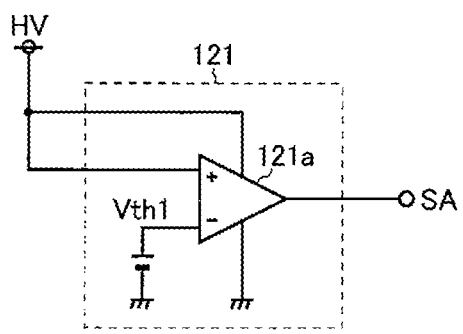
FIG. 5 is a circuit diagram showing an exemplary configuration of a first overvoltage detector 121.

FIG. 5 is a circuit diagram showing an exemplary configuration of the first overvoltage detector 121. The first overvoltage detector 121 includes a comparator 121a which compares the first supply voltage HV fed to its non-inverting input node (+) with the overvoltage detection voltage Vth1 fed to its inverting input node (−) to generate the first overvoltage detection signal SA. The first power node (high-potential node) of the comparator 121a is connected to a node to which the first supply voltage HV is applied. The second power node (low-potential node) of the comparator 121a is connected to a node to which a ground voltage GND is applied.

The undervoltage detector 122 monitors whether or not the first supply voltage HV is lower than an undervoltage detection voltage Vth2 (for example, Vth2=6 V) to generate an undervoltage detection signal SB. The undervoltage detection signal SB is, when the first supply voltage HV is higher than the undervoltage detection voltage Vth2, at a normal-mode logical level (low level (GND)) and, when the first supply voltage HV is lower than the undervoltage detection voltage Vth2, at an abnormal-mode logical level (high level (HV)).

Figure 6:
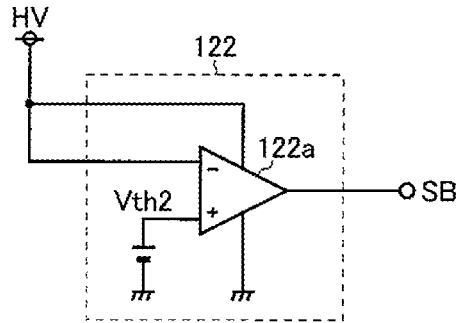
FIG. 6 is a diagram showing an exemplary configuration of an undervoltage detector 122.

FIG. 6 is a diagram showing an exemplary configuration of the undervoltage detector 122. The undervoltage detector 122 includes a comparator 122a which compares the first supply voltage HV fed to its inverting input node (−) with the undervoltage detection voltage Vth2 fed to its non-inverting input node (+) to generate the undervoltage detection signal SB. The first power node (high-potential node) of the comparator 122a is connected to the node to which the first supply voltage HV is applied. The second power node (low-potential node) of the comparator 122a is connected to the node to which the ground voltage GND is applied.

The second overvoltage detector 123 monitors whether or not the second supply voltage LV is higher than an overvoltage detection voltage Vth3 (for example, Vth3=8.5 V) to generate a second overvoltage detection signal SC. The second overvoltage detection signal SC is, when the second supply voltage LV is lower than the overvoltage detection voltage Vth3, at a normal-mode logical level (low level (GND)) and, when the second supply voltage LV is higher than the overvoltage detection voltage Vth3, at an abnormal-mode logical level (high level (LV)).

Figure 7:
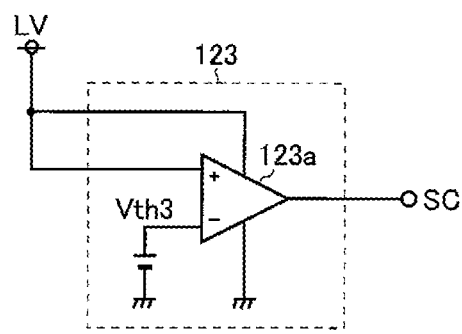
FIG. 7 is a circuit diagram showing an exemplary configuration of a second overvoltage detector 123.

FIG. 7 is a circuit diagram showing an exemplary configuration of the second overvoltage detector 123. The second overvoltage detector 123 includes a comparator 123a which compares the second supply voltage LV fed to its non-inverting input node (+) with the overvoltage detection voltage Vth3 fed to its inverting input node (−) to generate the second overvoltage detection signal SC. The first power node (high-potential node) of the comparator 123a is connected to a node to which the second supply voltage LV is applied. The second power node (low-potential node) of the comparator 123a is connected to the node to which the ground voltage (GND)) is applied.

The fault detection signal generator 124 monitors the first overvoltage detection signal SA, the undervoltage detection signal SB, and the second overvoltage detection signal SC to generate the fault detection signal S1. The fault detection signal generator 124 includes a level shifter 124a and an OR (logical addition) operator 124b.

The level shifter 124a shifts the level of the first overvoltage detection signal SA, which is driven to pulsate between the first supply voltage HV and the ground voltage GND, to generate a (shifted) first overvoltage detection signal SA', which is driven to pulsate between the second supply voltage LV and the ground voltage GND. Using the level shifter 124a eliminates the need to give the OR operator 124b an unnecessarily high withstand voltage.

Figure 8:
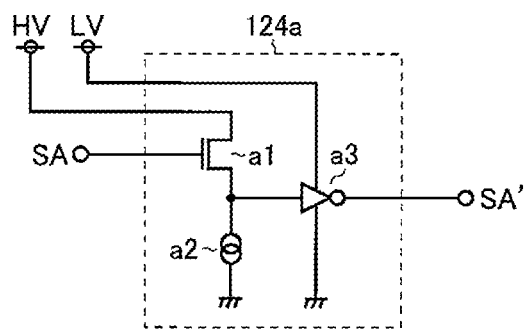

FIG. 8 is a circuit diagram showing an exemplary configuration of the level shifter 124a. The level shifter 124a of this exemplary configuration includes an N-channel MOS field-effect transistor a1, a current source a2, and an inverter a3. The drain of the transistor a1 is connected to the node to which the first supply voltage HV is applied. The source of the transistor a1 is connected, via the current source a2, to the node to which the ground voltage GND is applied. The gate of the transistor a1 is connected to a node to which the first overvoltage detection signal SA is connected. The input node of the inverter a3 is connected to the source of the transistor a1. The output node of the inverter a3 is connected to the node to which the first overvoltage detection signal SA' is applied. The first power node (high-potential node) of the inverter a3 is connected to the node to which the second supply voltage LV is applied. The second power node (low-potential node) of the inverter a3 is connected to the node to which the ground voltage GND is applied.

The OR operator 124b calculates the OR (logical sum) of the first overvoltage detection signal SA', the undervoltage detection signal SB, and the second overvoltage detection signal SC to generate the fault detection signal S1. The fault detection signal S1 is, when any of the first overvoltage detection signal SA', the undervoltage detection signal SB, and the second overvoltage detection signal SC is at high level, at high level (LV) and, when those signals are all at low level, at low level (GND).

The load driving circuit 11 includes a P-channel DMOS field-effect transistor PD1, an N-channel DMOS field-effect transistor ND1, P-channel MOS field-effect transistors P0 and P1, an N-channel MOS field-effect transistor N1, a resistor R1, a pre-driver DRV, a buffer BUF, an inverter INV, and a compensated supply voltage generator CVG.

The source of the transistor PD1 is connected to the node to which the first supply voltage HV (or the second supply voltage LV) is applied. The drain of the transistor PD1 is connected to an output node of an output signal OUT. The gate of the transistor PD1 is connected to the pre-driver DRV. The source of the transistor ND1 is connected to the node to which the ground voltage GND is applied. The drain of the transistor ND1 is connected to the output node of the output signal OUT. The gate of the transistor ND1 is connected to the pre-driver DRV.

The source of the transistor P0 is connected to the node to which the first supply voltage HV (or the second supply voltage LV) is applied. The drain of the transistor P0 is connected to the supply voltage input node of the pre-driver DRV. The gate of the transistor P0 is connected to the output node of the buffer BUF. The input node of the buffer BUF is connected to a node to which the fault detection signal S1 is applied. The first end of the resistor R1 is connected to the supply voltage input node of the pre-driver DRV. The second node of the resistor R1 is connected to the node to which the ground voltage GND is applied.

The source of the transistor P1 is connected to the node to which the first supply voltage HV (or the second supply voltage LV) is applied. The drain of the transistor P1 is connected to the gate of the transistor PD1. The gate of the transistor P1 is connected to the output node of the inverter INV. The input node of the inverter INV is connected to the node to which the fault detection signal S1 is applied. The source of the transistor N1 is connected to the node to which the ground voltage GND is applied. The drain of the transistor N1 is connected to the gate of the transistor ND1. The gate of the transistor N1 is connected to a node to which the fault detection signal S1 is applied.

In the load driving circuit 11 configured as described above, the transistors PD1 and ND1 correspond to a push-pull output circuit which, fed with the first supply voltage HV (or the second supply voltage LV), drives a load. More specifically, the transistor PD1 corresponds to an upper transistor which is connected between the node to which the first supply voltage HV (or the second supply voltage LV) is applied and the output node of the output signal OUT; the transistor ND1 corresponds to a lower transistor which is connected between the node to which the ground voltage GND is applied and the output node of the output signal OUT.

The pre-driver DRV is one of internal circuits which operate by being fed with the first supply voltage HV (or the second supply voltage LV), and corresponds to a driving circuit that generates driving signals for the push-pull output circuit (the gate signals of the transistors PD1 and ND1) according to instructions from the microprocessor 30.

The transistor P0 corresponds to a power switch which connects/disconnects (that is, makes conduct/cuts off) a supply voltage feed line leading to the internal circuits (including the pre-driver DRV) according to the fault detection signal S1. When the fault detection signal S1 is at low level (the normal-mode logical level), the transistor P0 is turned on to conduct the supply voltage feed line to the internal circuits. On the other hand, when the fault detection signal S1 is at high level (the abnormal-mode logical level), the transistor P0 is turned off to disconnect the supply voltage feed line leading to the internal circuits.

The transistor P1 corresponds to a first upper switch which, according to the fault detection signal S1, connects/disconnects between the gate of the transistor PD1 and the node to which the first supply voltage HV (or the second supply voltage LV) is applied. When the fault detection signal S1 is at low level (the normal-mode logical level), the transistor P1 is turned off to disconnect between the gate of the transistor PD1 and the node to which the first supply voltage HV (or the second supply voltage LV) is applied. On the other hand, when the fault detection signal S1 is at high level (the abnormal-mode logical level), the transistor P1 is turned on to connect between the gate of the transistor PD1 and the node to which the first supply voltage HV (or the second supply voltage LV) is applied.

The transistor N1 corresponds to a first lower switch which, according to the fault detection signal S1, connects/disconnects between the gate of the transistor ND1 and the node to which the ground voltage GND is applied. When the fault detection signal S1 is at low level (the normal-mode logical level), the transistor N1 is turned off to disconnect between the gate of the transistor ND1 and the node to which the ground voltage GND is applied. On the other hand, when the fault detection signal S1 is at high level (the abnormal-mode logical level), the transistor N1 is turned on to connect between the gate of the transistor ND1 and the node to which the ground voltage GND is applied.

The resistor R1 corresponds to a pull-down resistor which is connected between the supply voltage input node for the internal circuits and the node to which the ground voltage GND is applied.

The buffer BUF shifts the level of the fault detection signal S1, which is driven to pulsate between the second supply voltage LV and the ground voltage GND, to generate a gate signal G0 which is driven to pulsate between the first supply voltage HV (or the second supply voltage LV) and a first compensated supply voltage HV' (or a second compensated supply voltage LV'), and feeds the gate signal G0 to the gate of the transistor P0. The first compensated supply voltage HV' (or the second compensated supply voltage LV') is given, for example, a voltage value lower than the first supply voltage HV (or the second supply voltage LV) by a predetermined value α (for example, α=5 V). Using the buffer BUF having a level shifting capability eliminates the need to give the transistor P0 an unnecessarily high withstand voltage.

The inverter INV shifts the level of the fault detection signal S1, which is driven to pulsate between the second supply voltage LV and the ground voltage GND, and then logically inverts the result to generate a gate voltage G1 that is driven to pulsate between the first supply voltage HV (or the second supply voltage LV) and the first compensated supply voltage HV' (or the second compensated supply voltage LV'), and feeds the gate voltage G1 to the gate of the transistor P1. Using the inverter INV having a level shifting capability eliminates the need to give the transistor P1 an unnecessarily high withstand voltage.

Figure 9:
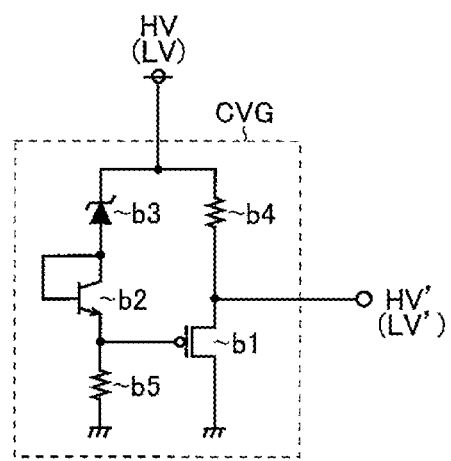
FIG. 9 is a circuit diagram showing an exemplary configuration of a compensated supply voltage generator CVG.

FIG. 9 is a circuit diagram showing an exemplary configuration of the compensated supply voltage generator CVG. The compensated supply voltage generator CVG of this exemplary configuration includes a P-channel MOS field-effect transistor b1, an npn-type bipolar transistor b2, a zener diode b3, and resistors b4 and b5. The source of the transistor b1 is connected to a node to which the first compensated supply voltage HV' (or the second compensated supply voltage LV') is applied; it is also connected, via the resistor b4, to the node to which the first supply voltage HV (or the second supply voltage LV) is applied. The drain of the transistor b1 is connected to the node to which the ground voltage GND is applied. The gate of the transistor b1 is connected to the emitter of the transistor b2, and is also connected, via the resistor b5, to the node to which the ground voltage GND is applied. The collector and the base of the transistor b2 are both connected to the anode of the zener diode b3. The cathode of the zener diode b3 is connected to the node to which the first supply voltage HV (or the second supply voltage LV) is applied. The compensated supply voltage generator CVG of this exemplary configuration can generate the first compensated supply voltage HV' (or the second compensated supply voltage LV') which is lower than the first supply voltage HV (or the second supply voltage LV) by a predetermined value α.

In the load driving circuit 11 configured as described above, when the fault detection signal S1 turns to high level (the abnormal-mode logical level), the transistor P0 is turned off, and the supply voltage feed line leading to the internal circuits including the pre-driver DRV is disconnected. Thus, even when there is a fault (an overvoltage or an undervoltage) in the first supply voltage HV or the second supply voltage LV, the internal circuits are prevented from destruction.

Incidentally, when the transistor P0 is turned off and the supply voltage feed line leading to the internal circuits is disconnected, the supply voltage input node for the internal circuits is pulled down, via the resistor R1, to the node to which the ground voltage GND is applied. Thus, no indefinite voltage appears at the supply voltage input node for the internal circuits, which are thereby prevented from abnormal operation.

On the other hand, in the load driving circuit 11 configured as described above, to avoid a drop in power efficiency ascribable to the on-state resistance component across a switch, no switch for connecting/disconnecting is provided in the supply voltage feed line leading to the push-pull output circuit.

Figure 10:
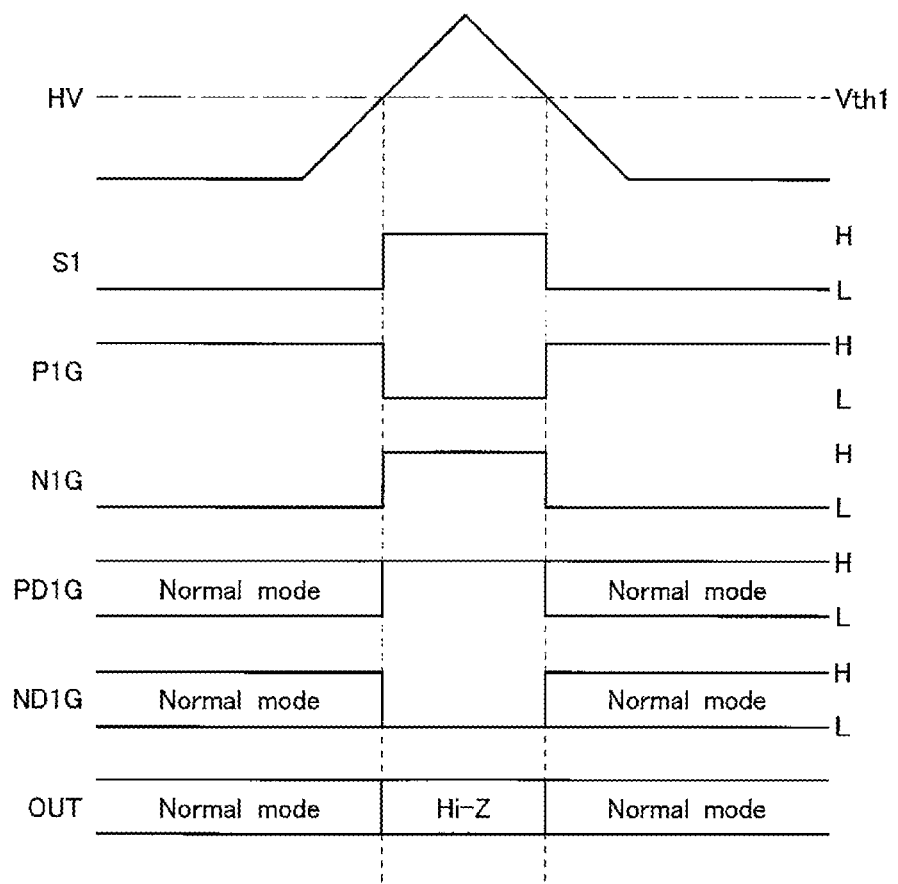
FIG. 10 is a timing chart showing an example of fault protection operation.

Instead, in the load driving circuit 11 configured as described above, as a means for protecting the transistors PD1 and ND1, the transistors P1 and N1 are provided. When the fault detection signal S1 turns to high level (the abnormal-mode logical level), the transistors P1 and N1 are turned on so that the transistors PD1 and ND1 both have their gate and source short-circuited together. As a result, the transistors PD1 and ND1 no longer receives any voltage between their gate and source. In this way, it is possible to protect the transistors PD1 and ND1 without unnecessarily increasing their gate-source withstand voltage. Needless to say, the transistors PD1 and ND1 need to be given a source-drain withstand voltage high enough to withstand a fault in the first supply voltage HV (or the second supply voltage LV). Incidentally, when the fault detection signal S1 turns to high level (the abnormal-mode logical level), the transistors PD1 and ND1 are both completely turned off, with the result that the output node of the output signal OUT is left in a floating state (a high-impedance state). FIG. 10 is a timing chart showing an example of the fault protection operation described above, showing, from top, the first supply voltage HV, the fault detection signal S1, the gate voltages of the transistors P1 and N1, the gate voltages of the transistors PD1 and ND1, and the output signal OUT.

Although not illustrated in FIG. 2, an electrostatic protection diode is commonly connected between the node to which the first supply voltage HV (or the second supply voltage LV) is applied and the node to which the ground voltage GND is applied. The electrostatic protection diode lies outside the scope of the protection operation based on the fault detection signal S1, and therefore needs to be implemented with a device that has a sufficiently high withstand voltage.

Figure 3:
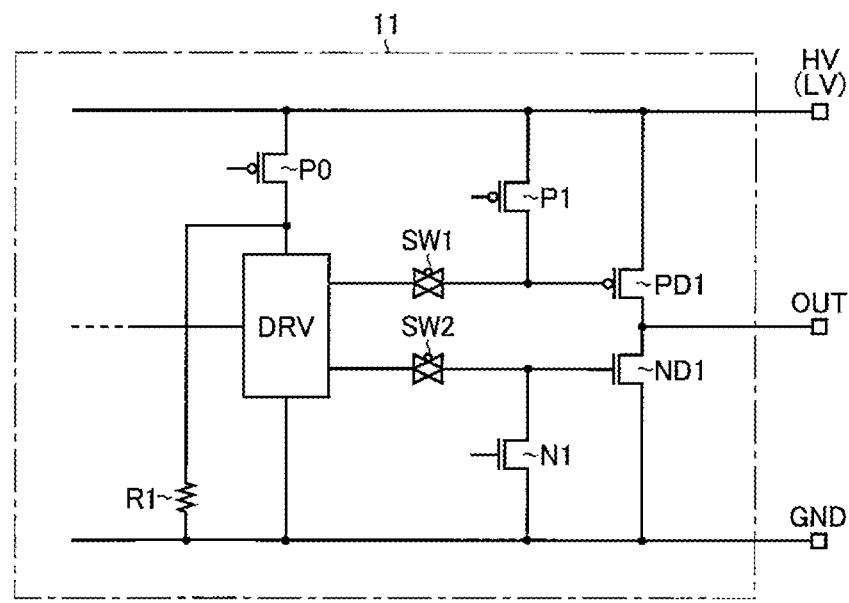
FIG. 3 is a circuit diagram showing a modified example of the load driving circuit 11.

FIG. 3 is a circuit diagram showing a modified example of the load driving circuit 11. As shown in FIG. 3, the load driving circuit 11 may be so configured as to have analog switches SW1 and SW2 connected to the gates of the transistors PD1 and ND1 respectively.

The analog switch SW1 corresponds to a second upper switch which, according to the fault detection signal S1, connects/disconnects between the gate of the transistor PD1 and the pre-driver DRV. When the fault detection signal S1 is at low level (the normal-mode logical level), the analog switch SW1 is turned on to connect between the gate of the transistor PD1 and the pre-driver DRV. On the other hand, when the fault detection signal S1 is at high level (the abnormal-mode logical level), the analog switch SW1 is turned off to disconnect between the gate of the transistor PD1 and the pre-driver DRV. Providing the analog switch SW1 makes it possible to more reliably keep the gate of the transistor PD1 at the first supply voltage HV (or the second supply voltage LV) when the fault detection signal S1 turns to high level (the abnormal-mode logical level).

The analog switch SW2 corresponds to a second lower switch which, according to the fault detection signal S1, connects/disconnects between the gate of the transistor ND1 and the pre-driver DRV. When the fault detection signal S1 is at low level (the normal-mode logical level), the analog switch SW2 is turned on to connect between the gate of the transistor ND1 and the pre-driver DRV. On the other hand, when the fault detection signal S1 is at high level (the abnormal-mode logical level), the analog switch SW2 is turned off to disconnect between the gate of the transistor ND1 and the pre-driver DRV. Providing the analog switch SW2 makes it possible to more reliably keep the gate of the transistor ND1 at the ground voltage GND when the fault detection signal S1 turns to high level (the abnormal-mode logical level).

As described above, a motor driver IC 10 adopting the configuration shown in FIG. 2 or 3 eliminates the need, in order to cope with overvoltage destruction testing and destructive testing in which supply voltages for two systems are connected the wrong way around (so-called cross connection testing), to give the transistors PD1 and ND1 an unnecessarily increased withstand voltage, or to connect an additional component externally to the motor driver IC 10. This contributes to reducing the chip area and reducing the cost of target products.

For example, in a case where overvoltage destruction testing is conducted in which the first supply voltage HV or the second supply voltage LV is intentionally brought into an overvoltage state, while the first supply voltage HV or the second supply voltage LV is held in an overvoltage state, the first overvoltage detection signal SA or the second overvoltage detection signal SC remains at high level, and this causes the fault detection signal S1 to turn to high level (the abnormal-mode logical level) and thereby activates the fault protection operation described above (see FIG. 10). The IC is thus prevented from smoking or destruction.

As discussed above, according to the protection technology described above, with respect to a device that handles a small signal, it can be protected from destruction by turning off a switch in a power supply line and, with respect to an output device that cannot be protected in that way, it can be protected from destruction through the introduction of a switch for turning its gate off. That is, as circuit elements for realizing the protection technology described above, both a gate-off switch against destruction of an output device and a switch for disconnecting a power supply line are both essential. The reason that a power supply line connected to an output device is not disconnected is to avoid an apparent increase in the on-state resistance of the output device which would result from the insertion of the switch.

On the other hand, in a case where destructive testing is conducted in which the first and second supply voltages LH and LV are connected the wrong way around (so-called cross connection testing), the undervoltage detection signal SB or the second overvoltage detection signal SC turns to high level and thereby activates the protection operation described above. The IC is thus prevented from smoking or destruction.

(Desktop PC)

Figure 11:
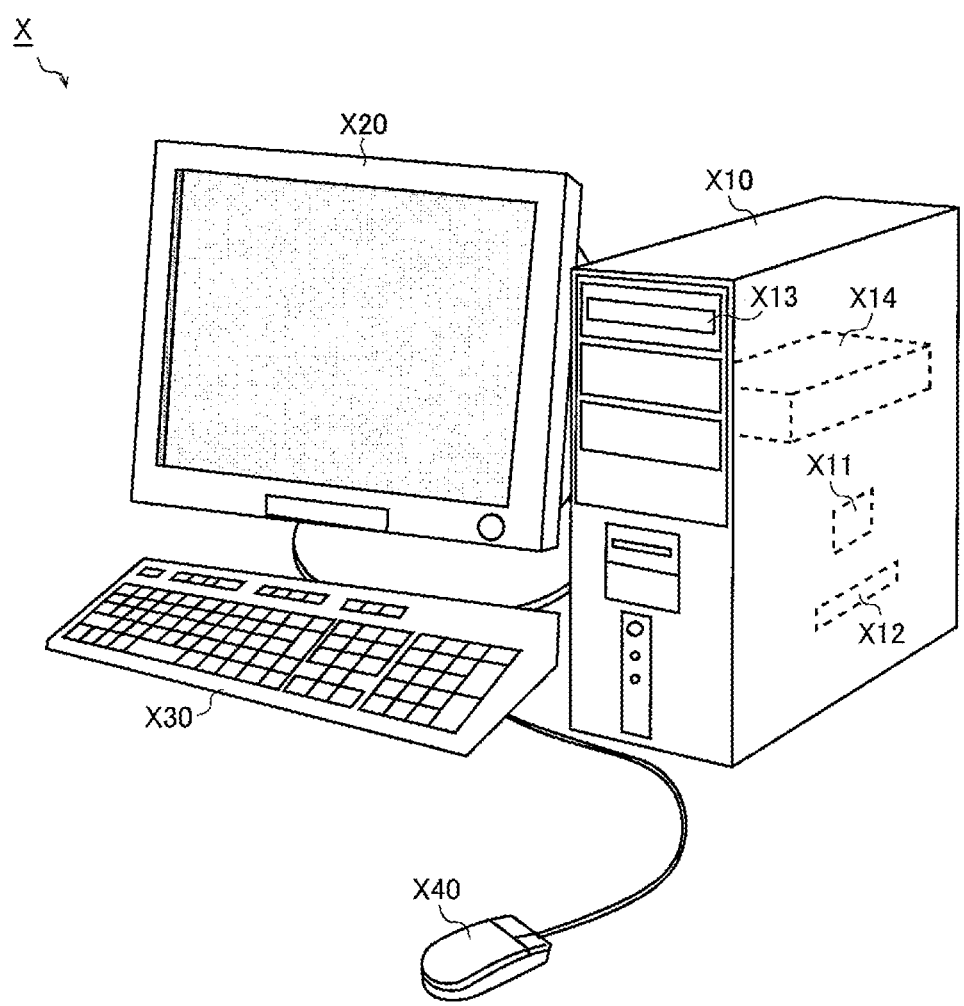
FIG. 11 is an external view of a desktop PC incorporating an optical disc drive.

FIG. 11 is an external view of a desktop personal computer (PC) incorporating the optical disc drive 1. The desktop PC X of this exemplary configuration includes a cabinet X10, a liquid crystal display monitor X20, a keyboard X30, and a mouse X40.

The cabinet X10 accommodates a central processing unit (CPU) X11, a memory X12, an optical drive X13, a hard disk drive X14, etc.

The CPU X11 executes an operating system and various application programs stored on the hard disk drive X14, and thereby controls the operation of the desktop PC X in an integrated fashion.

The memory X12 is used as a working area (for example, an area where task data is stored during execution of a program) by the CPU X11.

The optical drive X13 reads and writes optical discs. Examples of optical discs include CDs (compact discs), DVDs (digital versatile discs), and BDs (Blu-ray discs). As the optical drive X13, the optical disc drive 1 described previously can suitably be used.

The hard disk drive X14 is a type of large-capacity auxiliary storage device that stores programs and data on a non-volatile basis by use of a magnetic disk hermetically sealed inside a housing.

The liquid crystal display monitor X20 outputs video based on instructions from the CPU X11.

The keyboard X30 and the mouse X40 are each a type of human interface device that accepts user operation.

<Modifications and Variations>

Figure 4:
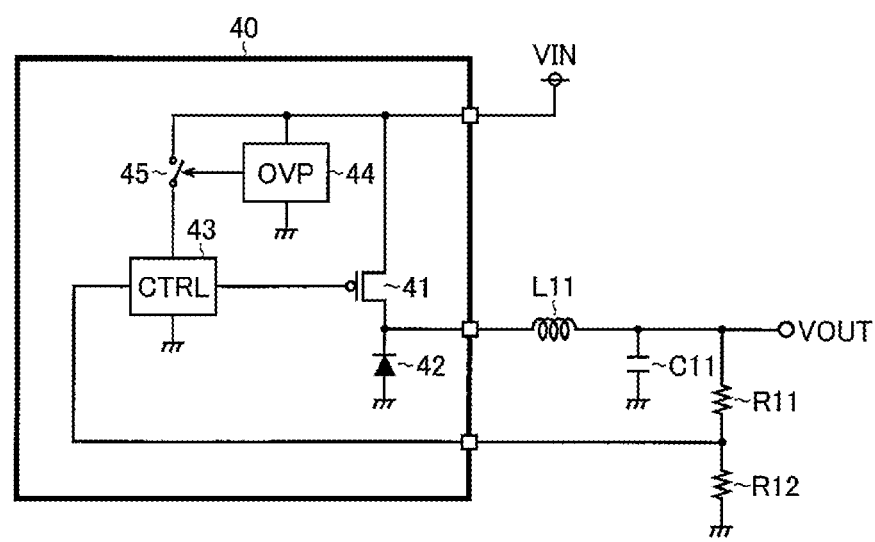
FIG. 4 is a circuit diagram showing an exemplary configuration of a switching regulator IC.

Although the embodiment described above deals with, as an example, a configuration where the present invention is applied to a motor driver IC 10, this is not meant to limit the scope of application of the present invention; the present invention finds wide application in load driving devices in general, such as switching regulator ICs like the one shown in FIG. 4.

FIG. 4 is a circuit diagram showing an exemplary configuration of a switching regulator IC to which the present invention is applicable. The switching regulator IC 40 of this exemplary configuration is a semiconductor integrated circuit device including a P-channel MOS field-effect transistor 41, a rectification diode 42, a switch controller 43, an overvoltage protector 44, and a power switch 45; it further has, externally connected to it as discrete devices constituting an output stage, a coil L11, a capacitor C11, and resistors R11 and R12. Although in this exemplary configuration, the output stage is configured as a step-down type, this is not meant to limit the configuration of the output stage; it may instead be of a step-up type or a step-up and -down type.

In the switching regulator IC 40 of this exemplary configuration, the transistor 41 corresponds to the transistor PD1 in FIG. 2, and the rectification diode 42 corresponds to the transistor ND1 in FIG. 2. The rectification diode 42 may be replaced with a synchronous-rectification transistor. The switch controller 43 corresponds to the pre-driver DRV (an internal circuit) in FIG. 2, and the overvoltage protector 44 corresponds to the fault detection circuit 12 in FIG. 2. The power switch 45 corresponds to the transistor P0 in FIG. 2. Although not explicitly shown in FIG. 4, a device corresponding to the transistor P1 in FIG. 2 may be provided, for example, between the gate and the source of the transistor 41.

Although the embodiment described above deals with, as an example, a configuration where the motor driver IC 10 is fed with supply voltages (HV and LV) for two systems, this is not meant to limit the present invention; even in cases where it is fed with supply voltages for three or more systems, it is possible to flexibly cope with them by providing an overvoltage detector and an undervoltage detector for each system and performing level shifting so as to adapt the signal level of a fault detection signal for each load driving circuit.

As discussed above, the present invention may be implemented in any other manners than specifically described by way of an embodiment above, with many modifications made without departing from the spirit of the present invention. That is, it is to be understood that the embodiment described above is in every way illustrative and not restrictive. The technical scope of the present invention is defined not by the description of the embodiment above but by the scope of the appended claims, and is to be understood to encompass any modifications made in the sense and scope equivalent to those of the claims.

INDUSTRIAL APPLICABILITY

The present invention contributes to enhancing the reliability of load driving devices.

LIST OF REFERENCE SIGNS 1 optical disc drive
10 load driving device (motor driver IC)
11 load driving circuit
111 spindle motor driver circuit
112 sled motor driver circuit
113 loading motor driver circuit
114 focus actuator driver circuit
115 tracking actuator driver circuit
116 tilt actuator driver circuit
12 fault detection circuit
121 first overvoltage detector
121a comparator
122 undervoltage detector
122a comparator
123 second overvoltage detector
123a comparator
124 fault detection signal generator
124a level shifter
a1 N-channel MOS field-effect transistor
a2 current source
a3 inverter
124b OR operator
20 load (motor/actuator)
21 spindle motor
22 sled motor
23 loading motor
24 focus actuator
25 tracking actuator
26 tilt actuator
30 microprocessor
40 switching regulator IC
41 P-channel MOS field-effect transistor
42 rectification diode
43 switch controller (internal circuit)
44 overvoltage protector (fault detection circuit)
45 power switch
PD1 P-channel DMOS field-effect transistor
ND1 N-channel DMOS field-effect transistor
P0, P1 P-channel MOS field-effect transistor
N1 N-channel MOS field-effect transistor
R1 resistor
DRV pre-driver
BUF buffer (with a level shifting capability)
INV inverter (with a level shifting capability)
CVG compensated supply voltage generator
b1 P-channel MOS field-effect transistor
b2 npn-type bipolar transistor
b3 zener diode
b4, b5 resistor
SW1, SW2 analog switch
L11 coil
C11 capacitor
R11, R12 resistor
X desktop PC
X10 cabinet
X11 CPU
X12 memory
X13 optical drive
X14 hard disk drive
X20 liquid crystal display monitor
X30 keyboard
X40 mouse

The invention claimed is:

1. A load driving device comprising:
an internal circuit which operates by being fed with a supply voltage;
an output circuit which drives a load by being fed with the supply voltage;
a fault detection circuit which monitors the supply voltage to generate a fault detection signal;
a power switch which connects/disconnects a supply voltage feed line leading to the internal circuit according to the fault detection signal, and wherein the output circuit includes a p-type transistor connected between a supply voltage node and an output node;
a first upper switch which connects/disconnects between a gate of the upper transistor and the supply voltage node according to the fault detection signal; and
a second upper switch which connects/disconnects between the gate of the upper transistor and the driving circuit according to the fault detection signal,
wherein the internal circuit includes a driving circuit which feeds a driving signal to the output circuit.

2. The load driving device according to claim 1, further comprising a pull-down resistor which is connected between a supply voltage input node of the internal circuit and a grounded node.

3. An electronic device comprising the load driving device according to claim 1 and a load driven by the load driving device.

4. The electronic device according to claim 3, wherein
the electronic device is an optical disc drive which is incorporated in a computer for playback from, or for recording to and playback from, an optical disc, and
the load is at least one of a spindle motor, a sled motor, a loading motor, a focus actuator, a tracking actuator, and a tilt actuator.

5. A load driving device comprising:
an internal circuit which operates by being fed with a supply voltage;
an output circuit which drives a load by being fed with the supply voltage;
a fault detection circuit which monitors the supply voltage to generate a fault detection signal;
a power switch which connects/disconnects a supply voltage feed line leading to the internal circuit according to the fault detection signal, and wherein the output circuit includes a p-type transistor connected between a supply voltage node and an output node, and an n-type transistor connected between a grounded node and the output node;
a first lower switch which connects/disconnects between a gate of the lower transistor and the grounded node according to the fault detection signal; and a second lower switch which connects/disconnects between the gate of the lower transistor and the driving circuit according to the fault detection signal, wherein the internal circuit includes a driving circuit which feeds the output circuit with a driving signal.

6. The load driving device according to claim 5, further comprising a pull-down resistor which is connected between a supply voltage input node of the internal circuit and a grounded node.

7. An electronic device comprising the load driving device according to claim 5 and a load driven by the load driving device.

8. The electronic device according to claim 7, wherein the electronic device is an optical disc drive which is incorporated in a computer for playback from, or for recording to and playback from, an optical disc, and the load is at least one of a spindle motor, a sled motor, a loading motor, a focus actuator, a tracking actuator, and a tilt actuator.

9. A load driving device comprising:

an internal circuit which operates by being fed with a supply voltage;

an output circuit which drives a load by being fed with the supply voltage;

a fault detection circuit which monitors the supply voltage to generate a fault detection signal;

a power switch which connects/disconnects a supply voltage feed line leading to the internal circuit according to the fault detection signal; and wherein:

the internal circuit includes a first internal circuit which operates by receiving a first supply voltage and a second internal circuit which operates by receiving a second supply voltage lower than the first supply voltage, the output circuit includes a first output circuit which drives a first load by receiving the first supply voltage and a second output circuit which drives a second load by receiving the second supply voltage, the fault detection circuit includes:

a first overvoltage detector which monitors the first supply voltage to generate a first overvoltage detection signal, the first overvoltage detector including a first comparator which generates the first overvoltage detection signal by comparing the first supply voltage with a first overvoltage detection voltage, a second overvoltage detector which monitors the second supply voltage to generate a second overvoltage detection signal, the second overvoltage detector including a second comparator which generates the second overvoltage detection signal by comparing the second supply voltage with a second overvoltage detection voltage, a fault detection signal generator which generates the fault detection signal based on the first and second overvoltage detection signals, a level shifter which shifts a signal level of, and then feeds to the fault detection signal generator, the first overvoltage detection signal, wherein the level shifter includes:

a transistor of which a drain is connected to a node to which the first supply voltage is applied and a gate is connected to a node to which the first overvoltage detection signal is applied, a current source which is connected between a source of the transistor and the grounded node, and an inverter of which an input node is connected to the source of the transistor, an output node is connected to the fault detection signal generator, a first supply voltage node is connected to a node to which the second supply voltage is applied, and a second supply voltage node is connected to the grounded node.

10. The load driving device according to claim 9, wherein the fault detection circuit further includes an undervoltage detector which monitors the first supply voltage to generate an undervoltage detection signal, and the fault detection signal generator generates the fault detection signal based on the first overvoltage detection signal, the second overvoltage detection signal, and the undervoltage detection signal.

11. The load driving device according to claim 10, wherein the undervoltage detector generates the undervoltage detection signal by comparing the first supply voltage with an undervoltage detection voltage.

12. An electronic device comprising the load driving device according to claim 9 and a load driven by the load driving device.

13. The electronic device according to claim 12, wherein the electronic device is an optical disc drive which is incorporated in a computer for playback from, or for recording to and playback from, an optical disc, and the load is at least one of a spindle motor, a sled motor, a loading motor, a focus actuator, a tracking actuator, and a tilt actuator.

14. A load driving device comprising:

an internal circuit which operates by being fed with a first supply voltage;

an output circuit which drives a load by being fed with the first supply voltage;

a fault detection circuit which monitors the first supply voltage to generate a fault detection signal;

a power switch which connects/disconnects a supply voltage feed line leading to the internal circuit according to the fault detection signal; and a level shifter which shifts a signal level of the fault detection signal, wherein the level shifter shifts the signal level of the fault detection signal from a state where the fault detection signal pulsates between a second supply voltage and a ground voltage to a state where the fault detection signal pulsates between the first supply voltage and a first compensated supply voltage which is lower than the first supply voltage by a predetermined value or to a state where the fault detection signal pulsates between the second supply voltage and a second compensated supply voltage which is lower than the second supply voltage by a predetermined value.

15. The load driving device according to claim 14, further comprising a compensated supply voltage generator which generates from the first or second supply voltage, and feeds to the level shifter, the first or second compensated supply voltage.

16. The load driving device according to claim 15, wherein the compensated supply voltage generator includes a first transistor of which a source is connected to a node to which the first or second compensated supply voltage is applied and a drain is connected to the grounded node, a second transistor of which an emitter is commented to a gate of the first transistor, a zener diode of which
an anode is connected to a base and a collector of the second transistor and
a cathode is connected to the node to which the first or second supply voltage is applied,
a first resistor which is connected between the source of the first transistor and the node to which the first or second supply voltage is applied, and
a second resistor which is connected between the emitter of the second transistor and the grounded node.

17. An electronic device comprising the load driving device according to claim 14 and a load driven by the load driving device.

18. The electronic device according to claim 17, wherein
the electronic device is an optical disc drive which is incorporated in a computer for playback from, or for recording to and playback from, an optical disc, and
the load is at least one of a spindle motor, a sled motor, a loading motor, a focus actuator, a tracking actuator, and a tilt actuator.

* * * * *